A. H. LANDRY.
HEAD MOTION FOR LOOMS.
APPLICATION FILED OCT. 20, 1916.
1,264,095.
Patented Apr. 23, 1918.
3 SHEETS—SHEET 1.
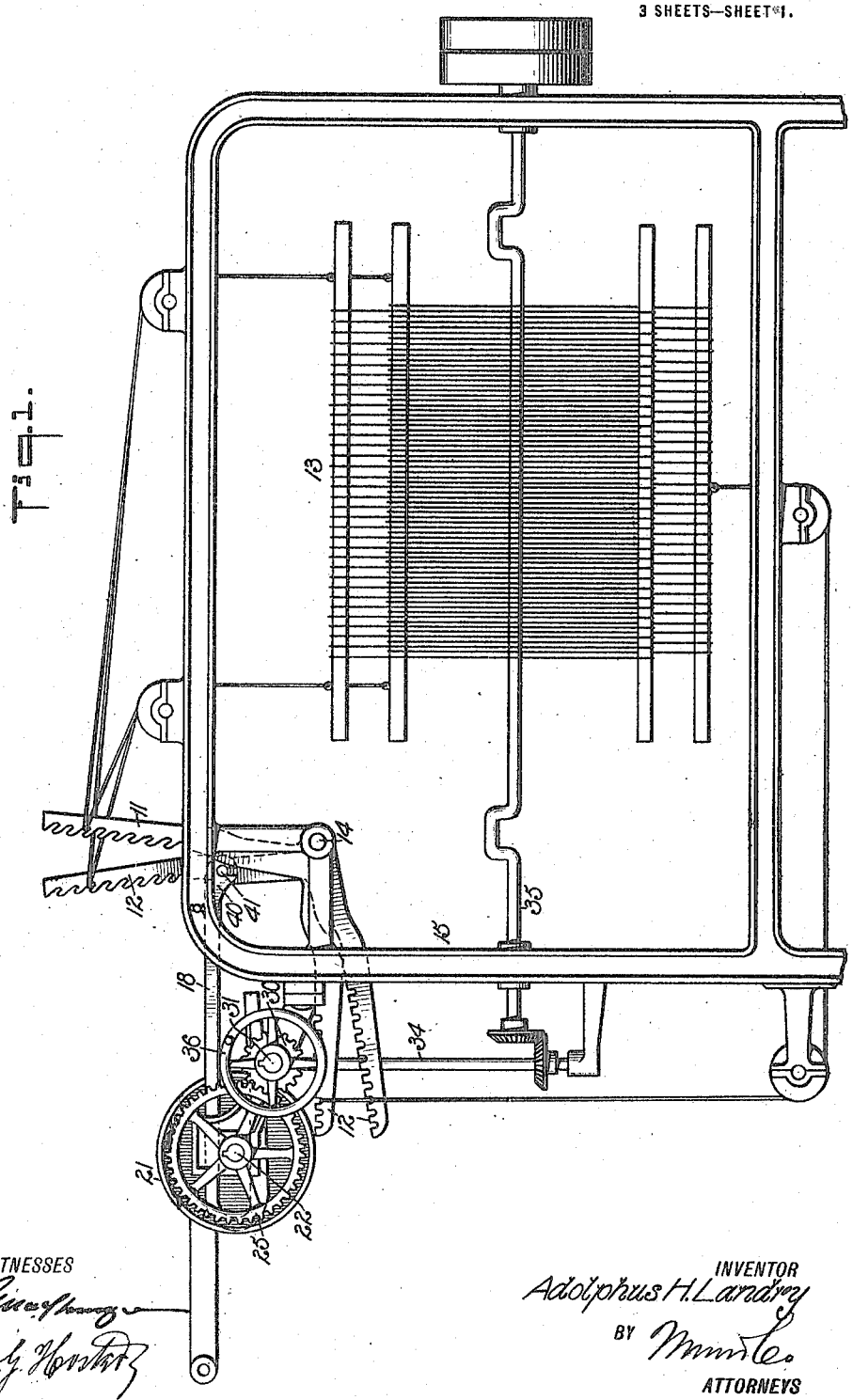
WITNESSES
INVENTOR
Adolphus H. Landry
BY
ATTORNEYS

A. H. LANDRY.
HEAD MOTION FOR LOOMS.
APPLICATION FILED OCT. 20, 1916.

1,264,095.

Patented Apr. 23, 1918.
3 SHEETS—SHEET 2.

WITNESSES

INVENTOR
Adolphus H. Landry
BY
ATTORNEYS

A. H. LANDRY.
HEAD MOTION FOR LOOMS.
APPLICATION FILED OCT. 20, 1916.
1,264,095.
Patented Apr. 23, 1918.
3 SHEETS—SHEET 3.
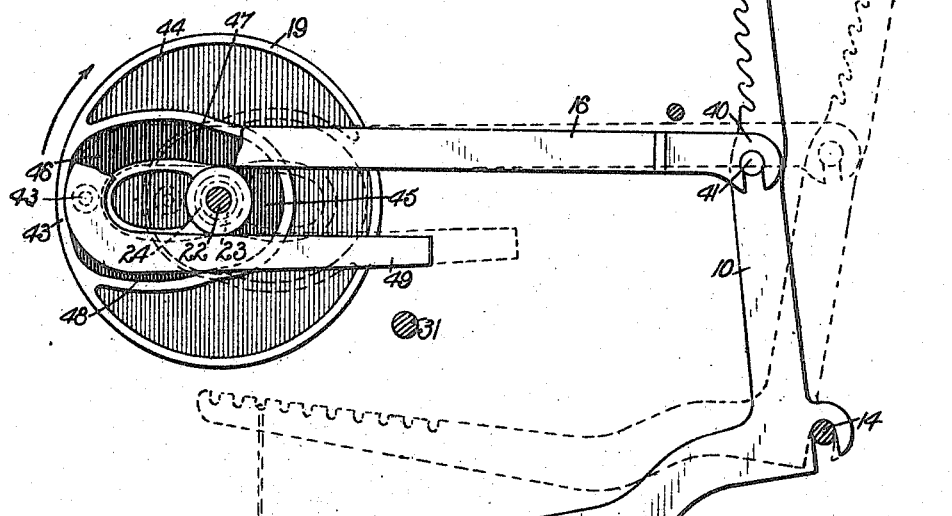
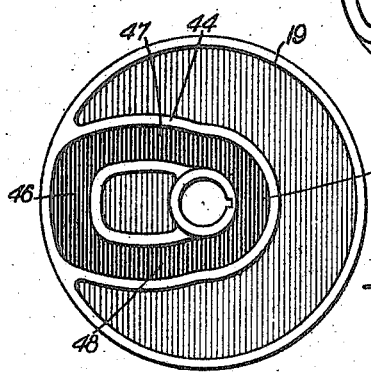
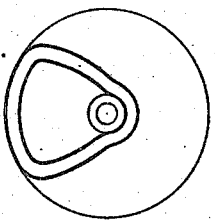
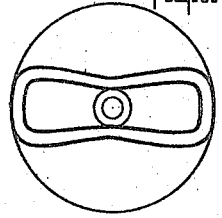
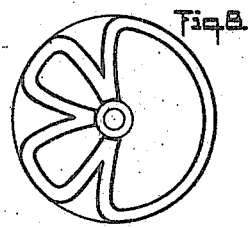
WITNESSES
INVENTOR
Adolphus H. Landry
BY
ATTORNEYS

UNITED STATES PATENT OFFICE.

ADOLPHUS HENRY LANDRY, OF TILTON, NEW HAMPSHIRE.

HEAD-MOTION FOR LOOMS.

1,264,095.

Specification of Letters Patent.

Patented Apr. 23, 1918.

Application filed October 20, 1916. Serial No. 126,711.

*To all whom it may concern:*

Be it known that I, ADOLPHUS H. LANDRY, a citizen of the United States, and a resident of Tilton, in the county of Belknap and State of New Hampshire, have invented a new and Improved Head-Motion for Looms, of which the following is a full, clear, and exact description.

The object of the invention is to provide a new and improved head motion for looms, more especially designed for weaving plain and fancy stripes, and arranged to positively actuate the harness and to allow of running the loom at a high rate of speed and without danger of producing imperfect weaves.

In order to produce the desired result, use is made of sets of harness jacks, sets of cams provided with face cam grooves and having their axes coinciding, connectors pivotally connecting the harness jacks with the cam grooves of the said cams, time shafts carrying the said sets of cams and one extending over the other, and driving means connected with the said shafts for rotating the shafts one independently of the other.

A practical embodiment of the invention is represented in the accompanying drawings forming a part of this specification, in which similar characters of reference indicate corresponding parts in all the views.

Figure 1 is a side elevation of the improved head motion for looms;

Fig. 2 is an enlarged plan view of the same with parts in section;

Fig. 3 is a sectional side elevation of the same on the line 3—3 of Fig. 2;

Fig. 4 is an enlarged sectional plan view of one end of the connectors;

Fig. 5 is a face view of one of the cams for a four-harness twill weave one up and three down;

Fig. 6 is a reduced face view of one of the cams for a four harness twill weave two up and two down;

Fig. 7 is a similar view of one of the cams for a two harness twill weave one up and one down; and Fig. 8 is a similar view of one of the cams for a twelve harness twill weave including seven up and one down, one up and one down, one up and one down.

The harness jacks 10, 11 and 12 are arranged in sets of three, four and five jacks, and the several jacks are connected in the usual manner with corresponding harnesses 13 to be actuated. The sets of jacks 10, 11 and 12 are fulcrumed on a single rod 14 attached to the loom frame 15, and the sets of jacks 10, 11 and 12 are connected at their upright members by sets of connectors 16, 17 and 18 with sets of cams 19, 20 and 21, it being understood that three cams 19, four cams 20 and five cams 21 are used to actuate the corresponding number of jacks 10, 11 and 12 and the harnesses connected therewith.

The set of cams 19 is keyed or otherwise secured on a shaft 22 and the set of cams 20 is keyed or otherwise secured on a hollow shaft 23 mounted to turn on a portion of the shaft 22, and the cams 21 are keyed or otherwise secured on a hollow shaft 24 through which extends the hollow shaft 23 so that the several shafts 22, 23 and 24 have their axes coinciding and the cams 19, 20 and 21 are arranged one alongside the other so as to take up comparatively little room, as will be readily understood by reference to Fig. 2. On the outer ends of the shafts 22, 23 and 24 are keyed or otherwise secured gear wheels 25, 26 and 27 in mesh with pinions 28, 29, 30 secured on a shaft 31 journaled in suitable bearings arranged on the frame 15. On the shaft 31 is secured a bevel gear wheel 32 in mesh with a bevel gear wheel 33 attached to the upper end of a vertical shaft 34 connected in the usual manner with the crank shaft 35 of the loom to rotate in unison with the same. Thus the shaft 31 rotates in unison with the main or crank shaft of the loom. On the outer end of the shaft 31 is secured a hand wheel 36 to permit of turning the shaft 31 and the cams 19, 20 and 21 by hand whenever it is desired to do so. The meshing gear wheels and pinions 25, 28; 26, 29; and 27, 30 are so proportioned that when the shaft 31 makes three revolutions, the three harness cams 19 make one revolution, the four harness cams 20 are rotated once for every four revolutions of the shaft 31, and the five harness cams 21 make one revolution for five revolutions of the shaft 31.

For different weaves, different sets of cams are used. For instance, if it is intended to weave a six harness twill weave with a four harness twill weave, it is necessary to use six cams and four cams on two different shafts in order to rotate each cam in the corresponding time for producing the desired weave. If it is desired to make only one twill weave in a piece of cloth, it is only necessary to use one set of cams and one gear wheel and one shaft.

As illustrated in Fig. 2, the three sets of cams 19, 20 and 21 produce three different weaves in one piece of cloth and are also capable of producing a three harness twill stripe, a four harness twill stripe and a five harness twill stripe in the same piece of cloth.

By driving the sets of cams 19, 20 and 21 simultaneously at each revolution of the shaft 31, the cams 19 are given one-third revolution, the cams 20 one-fourth revolution, and the cams 21 one-fifth revolution, so that each set of cams moves its harness into correct position on every turn of the shafts 31 and 35.

It is understood that the cam grooves in the different cams 19, 20 and 21 are shaped corresponding to the work required. Thus, for instance, the cam shown in Fig. 5 is for a four harness twill weave, one up and three down. The cam groove 44 of this cam has two concentric portions 45 and 46, the ends of which are connected with each other by cam portions 47 and 48 to impart the desired rocking motion to the harness jacks 10, 11 and 12. By the arrangement described each harness remains at a standstill during the time the friction roller 43 travels in the concentric cam portion 45 and is raised and lowered during the time the friction roller 43 travels in the connecting portions 47 and 48. The cam shown in Fig. 6 is for a four harness twill weave, two up and two down; the cam shown in Fig. 7 is for a two harness twill weave, one up and one down; and the cam shown in Fig. 8 is for a twelve harness twill weave, seven up, one down; one up, one down; one up and one down. It is understood that each set of cams has different time cam grooves to actuate the jacks intermittently according to the divisions of the time grooves as above described.

The connectors 16, 17 and 18 are alike in construction and hence it suffices to describe but one in detail. One end of each connector 16, 17 and 18 is in the form of an open eye 40 engaging a stud 41 on the upright member of the corresponding harness jack 10, 11 or 12. On the other end of each connector 16, 17 and 18 is journaled, by the use of a ball bearing 42, a friction roller 43 engaging a cam groove 44 formed in one face of the corresponding cam 19, 20 or 21.

As shown in Fig. 3, each connector 16, 17 and 18 extends above the hub of the corresponding cam 19, 20 and 21 and each outer end is provided with a return bent arm 49 extending under the hub of the corresponding cam 19, 20 or 21 so as to prevent an up or down swinging movement of the connector and to cause the cam to push and pull the connector alternately in opposite directions when the loom is running in view of the bearing which each connector thus has upon the upper and lower faces of its respective cam hub. By the arrangement described the harness jacks 10, 11 and 12 are positively actuated and an accurate movement is given to the same to prevent the formation of imperfect weaves. It will also be noticed that the loom can be run at a high rate of speed owing to the fact that the cam and connector mechanisms for the harness jacks 12 can be run at any speed without danger of improper functioning.

The left-hand portion of the shaft 24 is journaled in a suitable bearing 50 arranged on the main frame 15, and the right-hand end of the shaft 22 is journaled in a shaft 60 journaled in a bearing 51 arranged on the main frame 15. On the shaft 60 are keyed or otherwise secured the box motion cams 61 and on the outer end of the shaft 60 is secured a gear wheel 62 in mesh with a pinion 63 secured on the driving shaft 31 so that the box motion cams 61 are rotated when the loom is running. The box motion cams 61 are connected in the usual manner with the boxes containing the shuttles for carrying the weft threads through the open shed.

Having thus described my invention, I claim as new and desire to secure by Letters Patent:

1. In a head motion for looms a plurality of cam shafts, a plurality of jack cams on said shafts, provided with face cam grooves and hub portions and having their axes coinciding, and jack connectors having bearing on the cam hubs at one side and provided with friction rollers engaging the cam grooves of the said cams, the said connectors having return bent arms bearing on the opposite sides of the cam hubs, said cam shafts being arranged in telescoping relation and having gears of different diameters fixed thereto, a driven shaft adjacent to the cam shafts and having gears of different diameters in mesh with the said gears of the cam shafts, and a hand wheel on the said driven shaft, substantially as described.

2. In a head motion for looms, a plurality of cam shafts, a plurality of jack cams on said shafts, provided with face cam grooves and hub portions and having their axes coincident, and jack connectors extending at one end between the cams of the said sets of cams and provided with laterally projecting rollers extending into the cam groove, said connectors having their said ends disposed upon one side of the cam hubs and provided with return bent arms at the opposite sides of the cam hubs, said cam shafts being arranged in telescoping relation and having gears of different diameters fixed thereto, a driven shaft adjacent to the cam shafts and having gears of different diameters in mesh with the said gears of the cam shafts, and a hand wheel on the said driven shaft, all sustantially as described.

ADOLPHUS HENRY LANDRY.